United States Patent
Asheghian et al.

(10) Patent No.: US 9,064,130 B1
(45) Date of Patent: Jun. 23, 2015

(54) DATA LOSS PREVENTION IN THE EVENT OF MALWARE DETECTION

(75) Inventors: Daniel Asheghian, Culver City, CA (US); David Kane, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1320 days.

(21) Appl. No.: 12/395,498

(22) Filed: Feb. 27, 2009

(51) Int. Cl.
- *G06F 11/00* (2006.01)
- *G06F 7/04* (2006.01)
- *G06F 21/62* (2013.01)

(52) U.S. Cl.
CPC ........ *G06F 21/6218* (2013.01); *G06F 21/6281* (2013.01)

(58) Field of Classification Search
USPC ....................................... 726/27, 22
See application file for complete search history.

(56) References Cited

U.S. PATENT DOCUMENTS

| | | | |
|---|---|---|---|
| 6,249,866 B1 * | 6/2001 | Brundrett et al. ............. | 713/165 |
| 6,789,202 B1 * | 9/2004 | Ko et al. ......................... | 726/23 |
| 7,484,245 B1 * | 1/2009 | Friedman et al. ............... | 726/27 |
| 7,600,259 B2 * | 10/2009 | Qi .................................. | 726/25 |
| 2006/0048142 A1 * | 3/2006 | Roese et al. .................. | 717/176 |
| 2006/0143417 A1 * | 6/2006 | Poisner et al. ................ | 711/164 |
| 2007/0005919 A1 * | 1/2007 | van Riel ........................ | 711/163 |
| 2007/0050848 A1 * | 3/2007 | Khalid ............................ | 726/24 |
| 2008/0307489 A1 * | 12/2008 | Hubbard ......................... | 726/1 |
| 2009/0220088 A1 * | 9/2009 | Lu et al. ......................... | 380/277 |
| 2010/0083376 A1 * | 4/2010 | Pereira et al. .................. | 726/22 |

OTHER PUBLICATIONS

Chow et al., A generic anti-spywre solution by access control list at kernel level, 2005, Retrieved from the Internet <URL sciencedirect.com/science/article/pii/S0164121204000949#>, pp. 1-8 as printed.*

Olsen, Gary; Controlling desktops with AppLocker and softwar restriction policies; 2010; retrieved from the Internet <URL: searchenterprisedesktop.techtarget.com/tip/Controlling-desktops-with-AppLocker-and-software-restriction-policies>; pp. 1-6 as printed.*

Kishore, Aseem; How to Remove Spyware using HijackThis; 2008; Retrieved from the Internet <URL: online-tech-tips.com/cool-websites/hijackthis-spyware-removal/>; pp. 1-9 as printed.*

* cited by examiner

*Primary Examiner* — Michael Chao
(74) *Attorney, Agent, or Firm* — Lowenstein Sandler LLP

(57) ABSTRACT

A malware detection agent operating on a computing device detects one or more indicators of a potential data loss threat. Sensitive data is identified based on at least one of a logical location or a physical location of the sensitive data. One or more data loss prevention policies are enabled to protect the sensitive data until the potential data loss threat is resolved.

20 Claims, 10 Drawing Sheets

DATA LOSS PREVENTION IN THE EVENT OF MALWARE DETECTION

FIELD OF INVENTION

Embodiments of the invention relate to the field of data security, and more particularly, to enabling data loss prevention when potential malware is detected.

BACKGROUND OF THE INVENTION

Data loss prevention (DLP) solutions are used to protect sensitive data on a computer and/or network. A DLP product monitors a computer and/or network to identify sensitive data. Once sensitive data is detected, the DLP product applies one or more DLP policies to protect the data. However, in conventional DLP products, policies are manually enabled, disabled and otherwise managed by an administrator. Conventional DLP products are not capable of automatically enabling and disabling DLP policies based on a threat assessment.

SUMMARY OF THE INVENTION

A malware detection agent operating on a computing device detects one or more indicators of a potential data loss threat. Sensitive data is identified based on at least one of a logical location or a physical location of the sensitive data. One or more data loss prevention policies are enabled to protect the sensitive data until the potential data loss threat is resolved.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
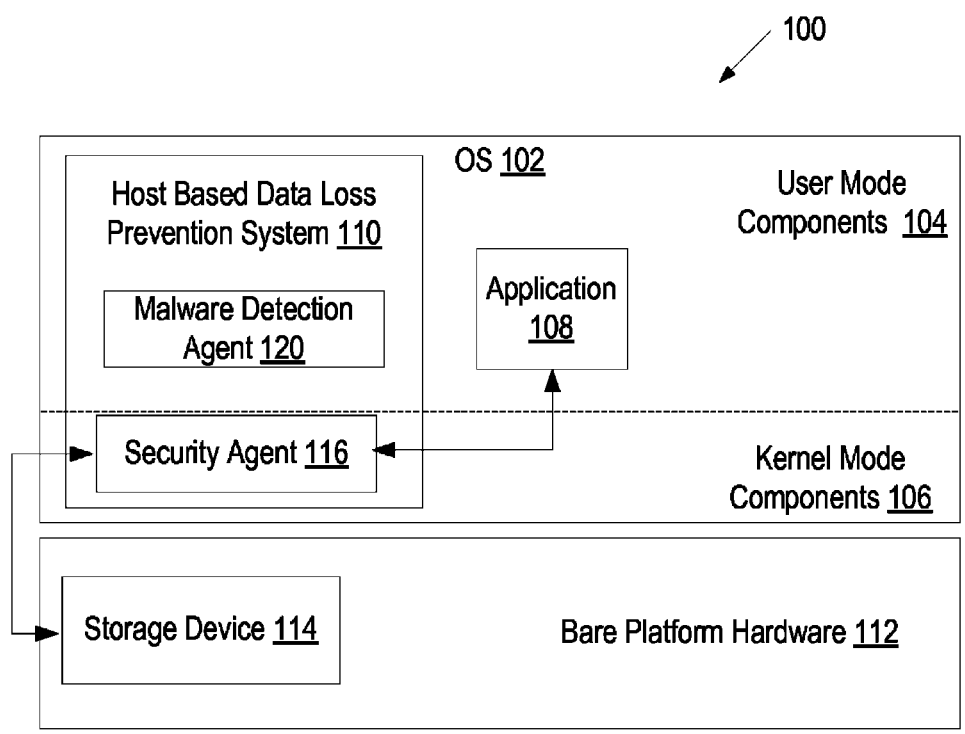
FIG. 1 illustrates a computing device, in accordance with one embodiment of the present invention.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "detecting", "identifying", "protecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a computing device 100, in accordance with one embodiment of the present invention. The computing device 100 includes bare platform hardware 112 and an operating system (OS) 102 that operates on the bare platform hardware 112. The platform hardware 112 can be of a personal computer (PC), server computer, mainframe, handheld device, portable computer, set-top box, or any other computing system. The platform hardware 112 can include a processor, memory, input/output (I/O) devices, a storage device 114, etc. The storage device 114 may be a non-volatile memory such as a hard disk drive, tape drive, optical disc drive, etc.

The operating system 102 provides an interface between bare platform hardware 112 and applications (e.g., application 108 and host based data loss prevention system 110). Operating system 102 provides multiple privilege levels of access to resources. In one embodiment, the operating system includes resources that can be accessed from a user mode or a kernel mode and resources that can be accessed only from the kernel mode. Any applications, routines, etc. running in the kernel mode (designated herein as kernel mode components 106) are assumed to be trusted software. Accordingly, these applications and routines can execute any instructions and reference any memory addresses. Applications (e.g., application 108) and routines running in the user mode (designated herein as user mode components 104) are considered untrusted software. Thus, these applications and routines must ask for permission each time they need to perform privileged instructions. Such requests for permission can be made via a system call. Examples of privileged instructions include instructions that modify registers of descriptor tables, perform input/output operations (e.g., reading or writing to storage device 114), create a new process, etc.

In one embodiment, a host based data loss prevention (DLP) system 110 runs on operating system 102 to prevent the loss of sensitive data. The host based DLP system 110 may include both user mode components 104 and kernel mode components 106. Host based DLP system 110 prevents the loss of data using one or more DLP policies. These DLP policies can be automatically enabled or disabled using other DLP policies.

In one embodiment, the host based DLP system 110 includes a malware detection agent 120. Alternatively, the malware detection agent 120 may not be a component of the host based DLP system 110. For example, the malware detection agent 120 may be a distinct antivirus system that communicates with host based DLP system 110. Though malware detection agent 120 is shown to be a user mode component 104, it may also be a kernel mode component 106, or may include both user mode components 104 and kernel mode components 106.

The malware detection agent 120 may detect the presence of malware using, for example, signature based and/or heuristic based algorithms. Types of malware that may be detected include viruses, spyware, Trojan horses, worms and so on. The malware detection agent 120 may also detect potential threats that may be indicative of malware or other threat sources before the malware has been explicitly identified. For example, the malware detection agent 120 may detect the presence and/or operation of a new unidentified software. Further analysis of the new software may identify the software as safe or as malware. In one embodiment, host based DLP system 110 enables one or more DLP policies when the new software is detected and before the analysis occurs. The DLP policies may remain enabled until the malware detection agent 120 analyzes the new software and determines that the new software is not malware and/or is not otherwise a threat. In another example, the malware detection agent 120 may determine that a previously unidentified application that attempts to access the network is a potential threat.

In one embodiment, the malware detection agent 120 also detects threats that are not caused by malware. For example, the malware detection agent 120 may include an intrusion detection component (not shown). The intrusion detection component may detect unauthorized attempts to access, manipulate and/or disable computing device 100. The intrusion detection component may be in the form of a host based intrusion detection system (HIDS) that identifies intrusions by analyzing system calls, application logs, file-system modifications, and other activities.

The host based data loss prevention system 110 is capable of dynamically enabling and/or disabling data loss prevention policies in response to threat assessments. Each DLP policy may be tuned, so that it has a particular sensitivity to potential threats. For example, less extreme DLP policies (e.g., undefined software, packed, compressed or otherwise self-obfuscated applications, unsigned applications, etc.) may be tuned such that they are enabled after only one or a few minor potential threats are detected. More extreme DLP policies may be tuned so that they are enabled after many minor potential threats are detected or after one or a few mid to high level potential threats (e.g., an application that appears to install other applications or download software from the network) are detected.

In one embodiment, a DLP policy enables security agent 116. Security agent 116 is a kernel mode component 106 that may be included in host based DLP 110. Alternatively, the security agent 116 may be separate and distinct from host based DLP 110.

In one embodiment, security agent 116 is a file system filter driver configured to protect sensitive data when activated (e.g., when potential threats are detected by host based DLP 110). Alternatively and/or in addition, the security agent 116 may be a disk filter driver (not shown). A file system filter driver is a driver that modifies the behavior of a file system. As a file system filter driver, the security agent 116 can filter I/O requests for one or more file systems and/or file system volumes. The security agent 116 can log, observe, modify and/or prevent I/O operations for file systems controlled by OS 102.

In one embodiment, security agent 116 is a file system filter driver configured to prevent I/O operations that are directed to sensitive data. These operations include creating, opening, closing, and enumerating files and directories; getting and setting file, directory, and volume information; and reading and writing file data. Security agent 116 may also support file system-specific features such as caching, locking, sparse files, disk quotas, compression, security, recoverability, reparse points, and volume mount points. Security agent 116 can intercept all I/O operation commands from applications (e.g., application 108) and routines running on OS 102.

Security agent 116 includes a record of sensitive file system locations (e.g., file system volumes). The record may be a list of drives (e.g., storage device 114) and/or folders (e.g., one or more volumes on storage device 114) that include sensitive information. For example, a business may store all customer credit card account information in a particular file system volume. If an intercepted I/O operation is directed to the file system volume storing the credit card account information, then security agent 116 can prevent the I/O operation from occurring. Alternatively, the security agent 116 may encrypt data in the drive or folder, or perform other protective actions, before permitting the I/O operation to proceed. Therefore, the sensitive data may be protected, for example, before an identified risk of a virus or worm has been conclusively determined to be an actual virus or worm.

Figure 2:
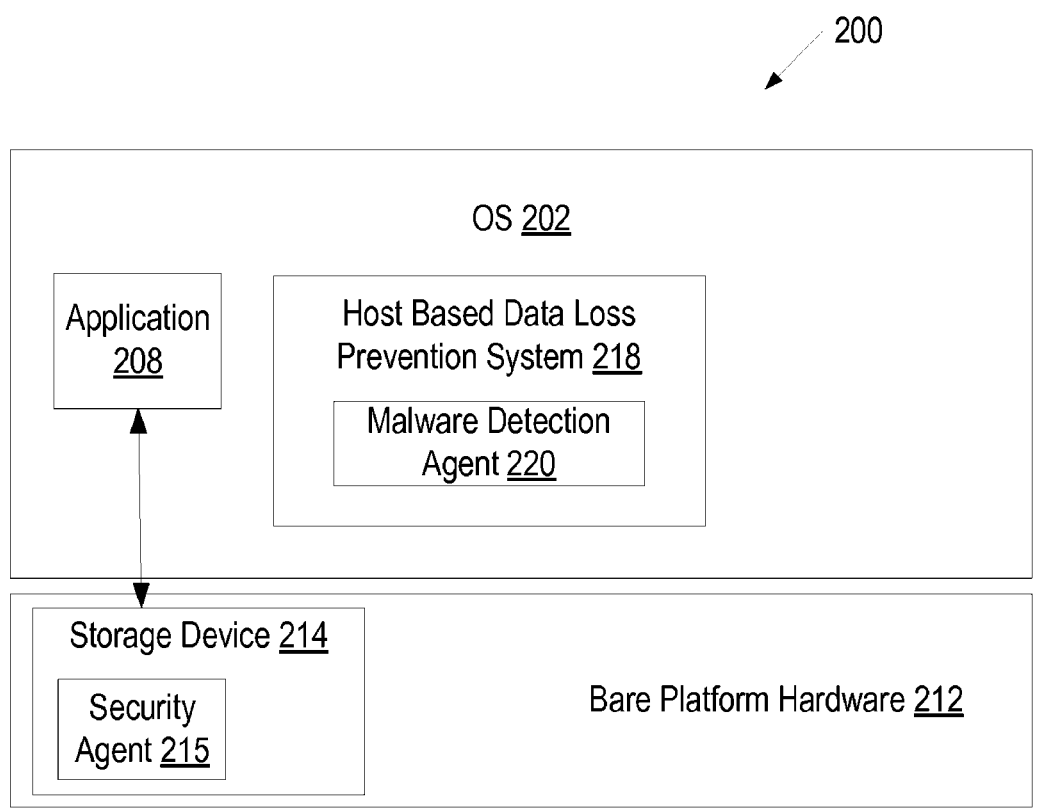
FIG. 2 illustrates a computing device, in accordance with another embodiment of the present invention.

FIG. 2 illustrates a computing device 200, in accordance with another embodiment of the present invention. The computing device 200 includes bare platform hardware 212 and an operating system (OS) 202 that operates on the bare platform hardware 212. The platform hardware 212 can include a processor, memory, input/output (I/O) devices, a storage device 214, etc. The storage device 214 may be a non-volatile memory such as a hard disk drive, tape drive, optical disc drive, etc.

An application 208 (or a routine, process, or other instruction set) and a host based data loss prevention system (DLP) 218 may be installed on the OS 202. The host based DLP system 218 may include a malware detection agent 220 that detects potential threats (e.g., of data loss, of virus infection, etc.). The host based DLP system 218 may also include one or more DLP policies that are activated when potential threats are detected. In one embodiment, one of the DLP policies enables a security agent 215 that is included in firmware of storage device 214. When host based DLP 218 detects a potential threat, it sends a command to storage device 214 activating the security agent 215.

Security agent 215 includes a record of sensitive data locations, such as a list of disk sectors/blocks that contain sensitive data. These blocks are associated with file system volumes that have sensitive data. While the security agent 215 is enabled, security agent 215 compares incoming I/O operation commands to the list of sensitive blocks. If the I/O operation command is directed to a sensitive block, then the security agent 215 blocks the command. The storage device 214 may send a message back to an application or routine (e.g., application 208) that attempted to access the sensitive data notifying it that access is denied. Alternatively, the security agent 215 may encrypt the sensitive blocks before performing the I/O operation.

Sensitive data may not always reside at the same blocks on storage device 214. Accordingly, host based DLP 218 may send messages to security agent 215 indicating which blocks include sensitive data. In one embodiment, the command that activates security agent 215 includes an indication of the blocks that include sensitive data. Alternatively, host based DLP 218 may send messages to security agent 215 indicating which blocks include sensitive data when the blocks that include sensitive data change. These messages may be sent to security agent 215 whether or not security agent 215 is enabled. Security agent 215 may store the list of blocks including sensitive data. When security agent 215 is enabled, it may then read the stored list of blocks to determine those blocks that should be protected.

Figure 3:
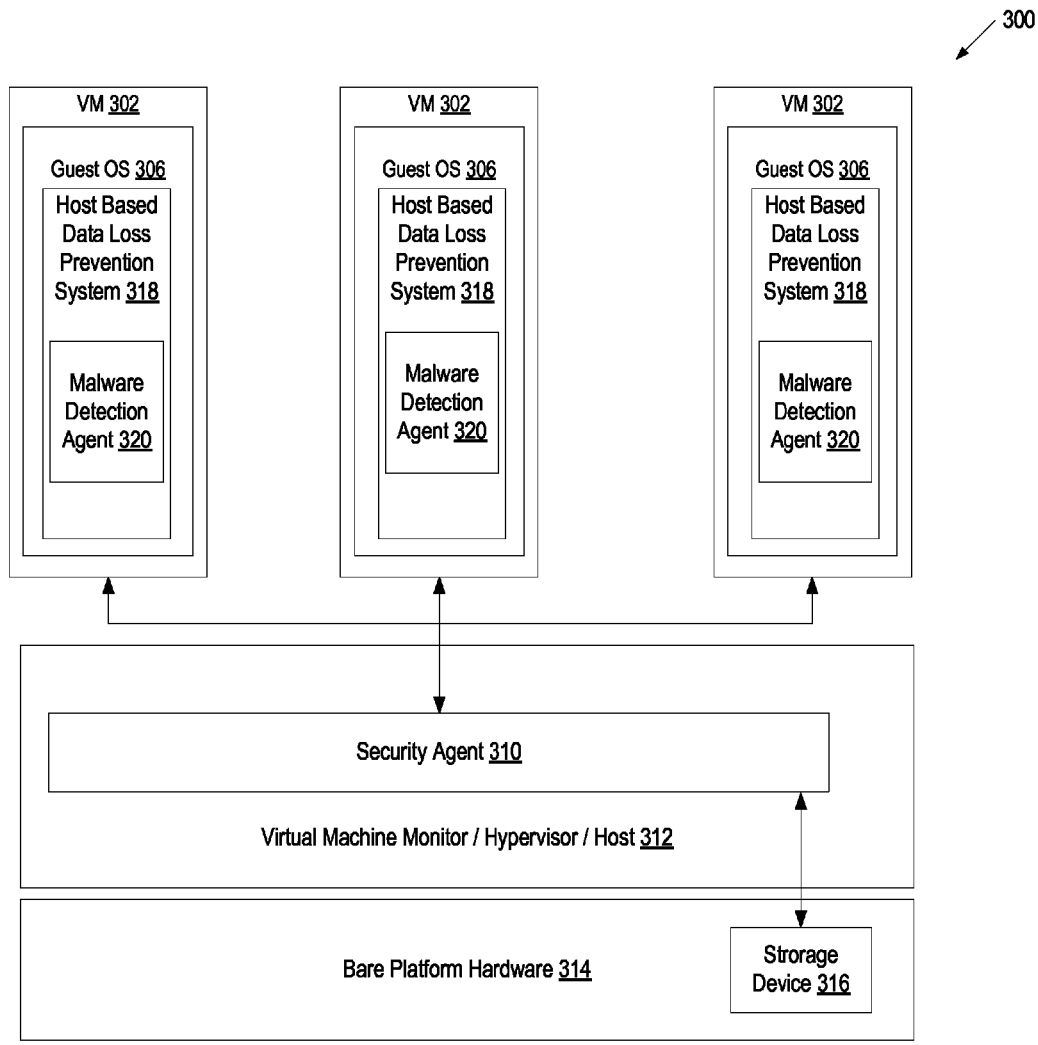
FIG. 3 illustrates a computing device, in accordance with yet another embodiment of the present invention.

FIG. 3 illustrates a computing device 300, in accordance with yet another embodiment of the present invention. The computing device 300 includes bare platform hardware 314, a virtual machine monitor (VMM) 312 and one or more virtual machines 302. Each of the virtual machines 302 hosts a guest operating system 306. The platform hardware 314 can include a processor, memory, input/output (I/O) devices, a storage device 316, etc. The storage device 316 may be a non-volatile memory such as a hard disk drive, tape drive, optical disc drive, etc.

The VMM (also known as a hypervisor) 312, though typically implemented in software, may emulate and export a bare machine interface to higher level software. Such higher level software may comprise a standard or real-time OS, may be a highly stripped down operating environment with limited operating system functionality, may not include traditional OS facilities, etc. In one embodiment, the VMM 312 is run directly on bare platform hardware 314. In another embodiment, the VMM 312 is run on top of a host OS. Alternatively, for example, the VMM 312 may be run within, or on top of, another VMM. VMMs may be implemented, for example, in hardware, software, firmware or by a combination of various techniques.

The VMM 312 presents to other software (i.e., "guest" software) the abstraction of one or more virtual machines (VMs), which may provide the same or different abstractions to the various guests. FIG. 3 shows multiple virtual machines 302, each with a guest operating system 306. Each guest OS 306 includes a host based DLP system 318 that manages DLP policies on the guest OS 306. The host based DLP system 318 may include a malware detection agent 320 that can detect malware, intrusion attempts and other potential threats. The host based DLP system 318 can be a component of the guest OS 306, a plugin of the guest OS 306, or a separate module running on the guest OS 306.

As discussed above, the VMM 312 has control over the storage device 316 and can monitor commands for I/O operations on storage device 316. In one embodiment, the VMM 312 has a security agent 310 that monitors for I/O operations directed to storage device 316, and determines whether the I/O operation is directed to sensitive data. The sensitive data may include, for example, account user names and passwords, credit card numbers, social security numbers, account numbers, employee numbers, driver license numbers, license plate numbers, etc. The security agent 310 may identify sensitive data based on location. For example, all data stored in a user accounts folder may be considered sensitive data. If the security agent 310 determines that the I/O operation is directed to sensitive data, the security agent 310 can cause the I/O operation to be delayed or blocked. Otherwise, if the security agent 310 determines that the I/O operation does not correspond to sensitive data, the security agent 310 can cause the I/O operation to be sent on to storage device 316.

The security agent 310 can be a component of the VMM 312, a plugin of the VMM 312, or a separate module within the VMM layer with the same privilege level as the VMM 312. In one embodiment, the security agent 310 is enabled upon receiving a command from one of the host based DLP systems 318. The command may or may not include an identification of sensitive data (e.g., a list of locations that contain sensitive data). Once the security agent 310 is enabled, it may monitor I/O operations of all guest operating systems 306 to detect those that are directed to sensitive data. In one embodiment, the security agent 310 sends notifications to host based DLP systems 318 when attempts to access sensitive data are detected.

Figure 4:
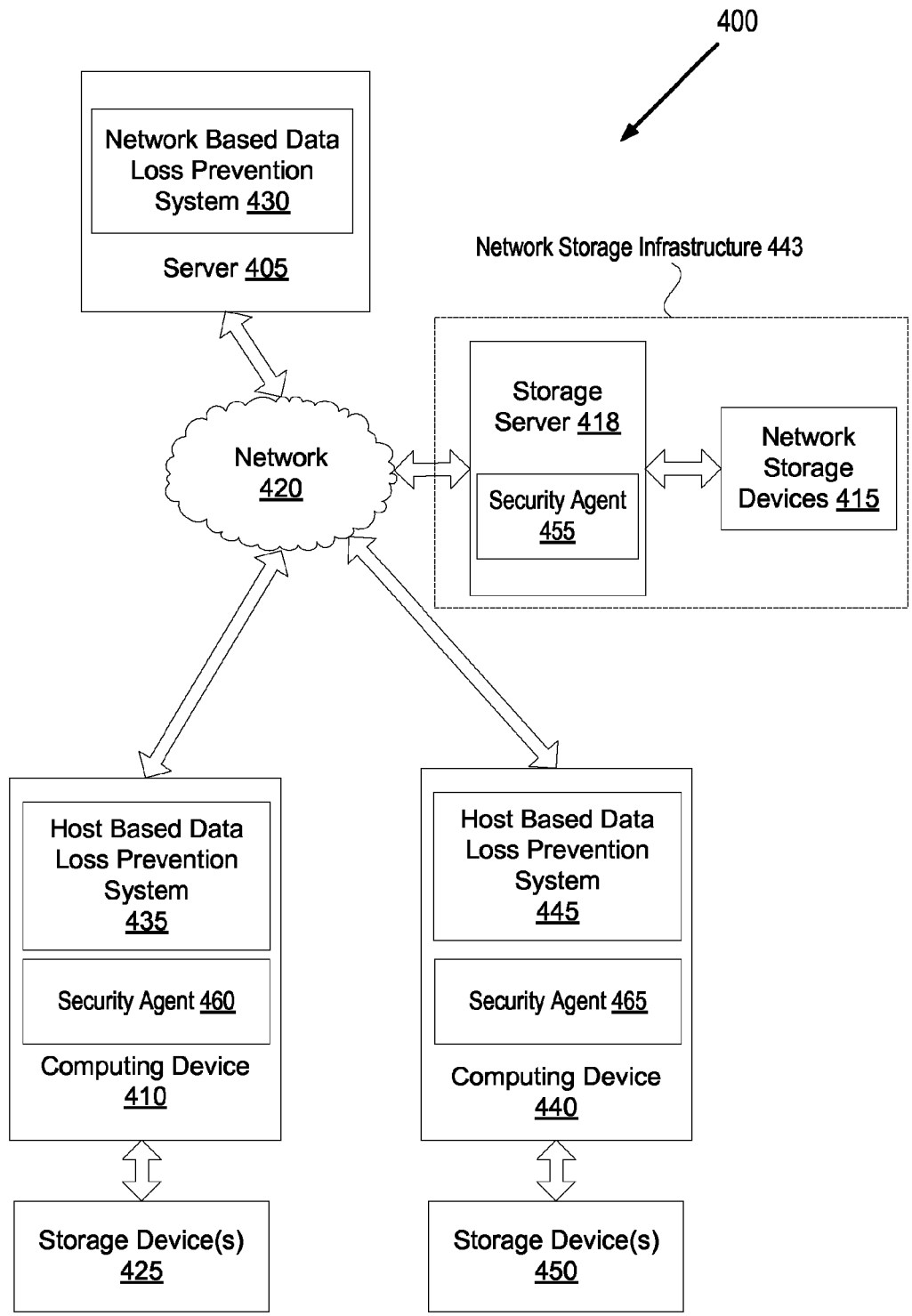
FIG. 4 illustrates an exemplary network architecture, in which embodiments of the present application may operate.

FIG. 4 illustrates an exemplary network architecture 400, in which embodiments of the present application may operate. The network architecture 400 may include a server 405, computing devices 410, 440 and network storage infrastructure 443 connected via a network 420. The network 420 may be a public network (e.g., the Internet) or a private network (e.g., a local area network (LAN) or wide area network (WAN)). Network 420 may be the network of an enterprise, and may also include such devices as network printers, switches, routers, gateways, firewalls, or any other devices having a network address.

The network storage infrastructure 443 may include a storage server 418 and one or more network storage devices 415 managed by the storage server 418 that provide storage to computing devices 410, 440. Storage server 418 may be configured to provide file-level access (e.g., as provided by network attached storage (NAS)), block-level access (e.g., as provided by a storage area network (SAN)), or a combination of file-level access and block-level access to data stored on the network storage devices 415. In one embodiment, storage server 418 includes a security agent 455, as described below. Each of the network storage devices 415 may be a hard disk drive, a tape backup drive, an optical drive, or other storage medium.

The computing devices 410 and 440 may be laptop computers, desktop computers, mobile phones, personal digital assistants (PDAs), or other endpoint computing devices connected to network 420. Computing devices 410, 440 may correspond to computing device 100 of FIG. 1, computing device 200 of FIG. 2 and/or computing device 300 of FIG. 3. Each computing device 410, 440 includes a host based data loss prevention system (DLP) 435, 445. Each host based DLP system 435, 445 protects a specific computing device 410, 440 from data loss. In one embodiment, when a host based DLP system 435, 445 detects a potential threat, it enables one or more DLP policies to protect sensitive data. For example, host based DLP system 435 may protect computing device 410 by enabling DLP policies that restrict access to sensitive data stored on storage device 425. Similarly, host based DLP system 445 may protect computing device 440 by enabling DLP policies that restrict access to sensitive data stored on storage device 450. Additionally, the host based DLP systems 435, 445 may notify a network based data loss prevention system 430 of the potential threat.

The server 405 may be a computing device such as, for example, a desktop computer, laptop computer, server, etc. Server 405 includes a network based DLP system 430. The network based DLP system 430 protects sensitive data that is at rest and/or in transit on network 420. Network based DLP system 430 may protect data that is present on network storage 415 and/or data that is present on storage devices 425, 450 of individual computing devices 410, 440. The server 405 in one embodiment is a network appliance that is configured to enforce network DLP policies on network 420.

Upon receiving a notification that a potential threat has been detected by a host based DLP system 435, 445, network based DLP system 430 may enable one or more DLP policies. In one embodiment, an enabled DLP policy activates security agent 455 that resides on storage server 418. The security agent 455 may then filter I/O operations received by storage server 418 that are directed to sensitive data stored on the network storage devices 415. While active, the security agent 455 may block I/O operations directed to sensitive data (e.g., data stored in locations that are identified as containing sensitive data) and/or may encrypt sensitive data before performing requested I/O operations.

Network based DLP system 430 may also send notifications to one or more host based DLP systems 435, 445 to instruct them to enable DLP policies. The notifications may cause the host based DLP systems 435, 445 to enable DLP policies if certain software or activities are detected on the computing devices 410, 440. Alternatively, the host based DLP systems 435, 445 may automatically enable one or more DLP policies upon receiving the notification.

In one embodiment, network based DLP system 430 sends messages to those host based DLP systems that are responsible for managing DLP policies on computing devices that contain especially sensitive information. For example, computing device 410 may store social security numbers and/or credit card numbers on storage device 425, while computing device 440 may contain minimal or no sensitive data. If network based DLP system 430 is notified of a potential threat, it may instruct host based DLP system 435 to enable a DLP policy, but may not instruct host based DLP system 445 to enable a DLP policy. This can provide increased protection to especially sensitive data without unnecessarily inhibiting operations that affect only non-sensitive data.

Figure 5A:
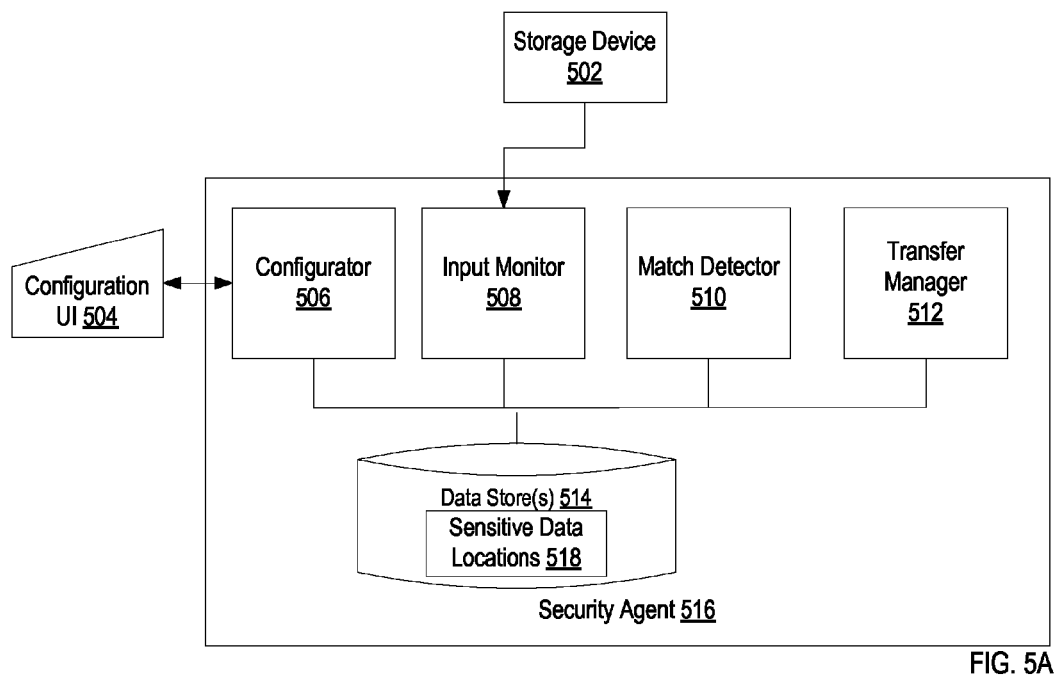
FIG. 5A is a block diagram of one embodiment of a security agent.

FIG. 5A is a block diagram of one embodiment of a security agent 516. The security agent 516 may correspond to security agent 116 of FIG. 1, security agent 215 of FIG. 2, security agent 310 of FIG. 3 or security agent 455 of FIG. 4. The security agent 516 may include a configurator 506, an input monitor 508, a match detector 510, a transfer manager 512, one or more data stores 514, and/or any other components.

The configurator 506 is responsible for configuring the security agent 516. In one embodiment, the configurator 506 provides a user interface (UI) 504 that allows a user to specify configuration properties of the security agent 516. For example, the user can use the UI 504 to enter locations of sensitive data. The configurator 506 may maintain a record of sensitive data locations 518 in data store 514, which may be a database, a repository, one or more files, or the like.

The input monitor 508 is responsible for monitoring I/O operations that are directed to storage device 502. The I/O operations are generated by applications and routines that operate on a guest OS 306. The I/O operations may be, for example, operations for creating, opening, closing, and enumerating files and directories; getting and setting file, directory, and volume information, etc. In one embodiment, the input monitor 508 constantly monitors I/O operations. In another embodiment, the input monitor 508 monitors I/O operations when activated by a host based DLP system or network based DLP system.

The match detector 510 is responsible for determining whether the I/O operations are directed to sensitive data that is stored on storage device 502. Depending on the determination made by the match detector 510, the transfer manager 512 may or may not decide to permit the I/O operation to proceed. If there was no match between the location of the subject of the I/O operation and any location containing sensitive data (e.g., as identified by the recorded sensitive data locations 518), then the transfer manager 512 permits the I/O operation to occur. Otherwise, if a match was found, the transfer manager 512 may block or delay the I/O operation, or may perform some other action (e.g., encrypting sensitive data) before permitting the I/O operation to occur. In one embodiment, the transfer manager 512 may send a notification to a host based DLP system and/or network based DLP system that the I/O operation was blocked, or that another action was performed to safeguard sensitive data.

Figure 5B:
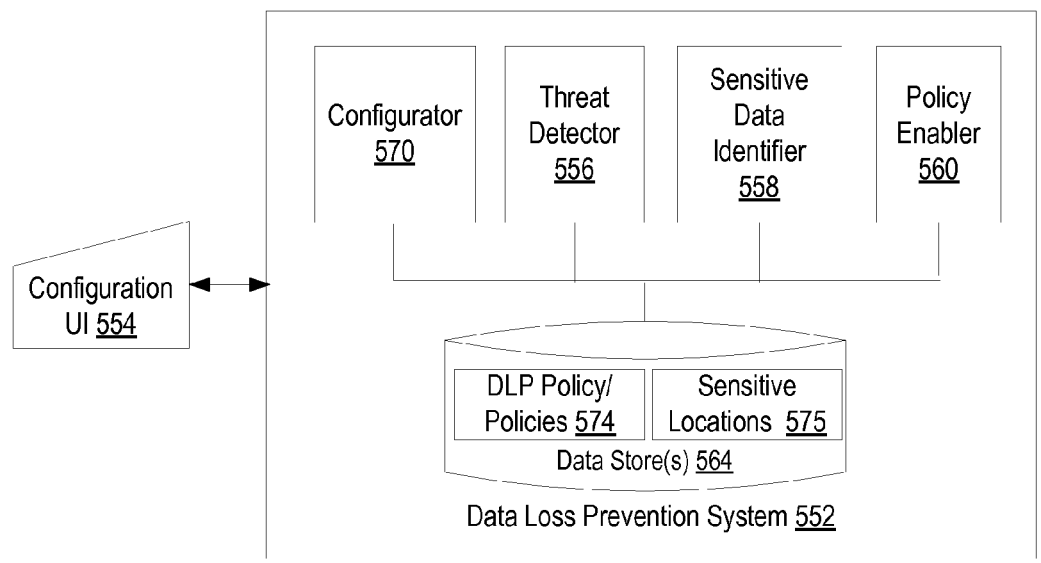
FIG. 5B is a block diagram of one embodiment of a data loss prevention system.

FIG. 5B is a block diagram of one embodiment of a data loss prevention (DLP) system 552. The DLP system 552 may be a host based DLP system (e.g., host based DLP system 110 of FIG. 1, host based DLP system 218 of FIG. 2, host based DLP system 318 of FIG. 3 or host based DLP system 435 or 445 of FIG. 4) or a network based DLP system (e.g., network based DLP system 430 of FIG. 4). The security agent 516 may include a configurator 570, a threat detector 556, a sensitive data identifier 558, a policy enabler 560, one or more data stores 564, and/or any other components.

The configurator 570 is responsible for configuring the DLP system 552. In one embodiment, the configurator 506 provides a user interface (UI) 554 that allows a user to specify configuration properties of the DLP system 552. For example, the user can use the UI 554 to enter locations of sensitive data, to install new DLP policies, to modify when DLP policies should be enabled, etc. The configurator 570 may maintain a record of sensitive data locations 575 and DLP policies 574 in data store 564, which may be a database, a repository, one or more files, or the like.

The threat detector 556 is responsible for monitoring a network or computing device to determine whether any activity represents a potential threat (e.g, of data loss). In one embodiment, the threat detector is a malware detection agent. Alternatively, the threat detector 556 may be a component of the DLP system 552 that communicates with one or more external malware detection agents, such as an antivirus system, an intrusion detection system, etc.

The policy enabler 560 enables one or more DLP policies 574 upon the threat detector 556 detecting a potential threat. The DLP policies 574 may activate and/or control one or more security agents. In one embodiment, at least one security agent (not shown) is included in the DLP system 552. Once the threat detector 556 determines that a potential threat has ended, policy enabler 560 may disable the enabled policies.

Sensitive data identifier 558 maintains the record of sensitive data locations 575. Sensitive data identifier 558 also sends notifications to security agents that identify the sensitive data locations 575. Such notifications may be sent when the DLP policies controlling the security agents are enabled, or as updates to sensitive data locations are made.

Figure 6:
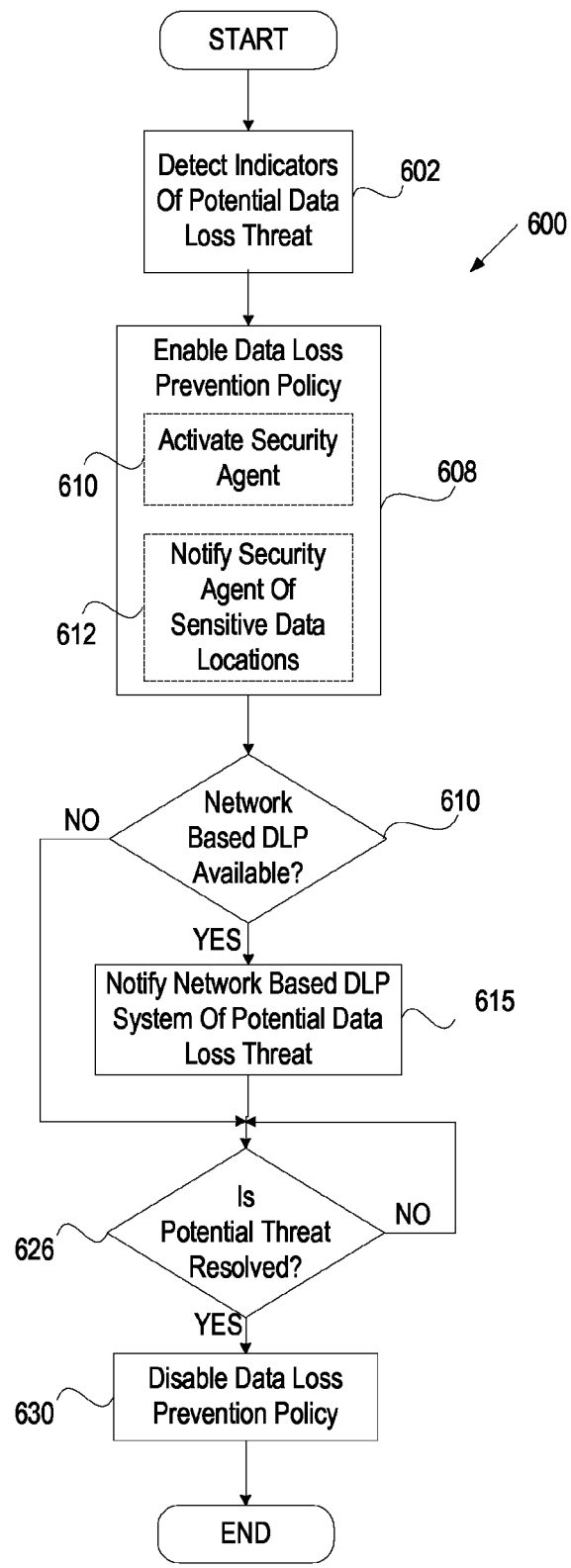
FIG. 6 is a flow diagram of one embodiment of a method for protecting sensitive data.

FIG. 6 is a flow diagram of one embodiment of a method 600 for protecting sensitive data. The method 600 is performed by processing logic that may comprise hardware (circuitry, dedicated logic, etc.), software (such as is run on a general purpose computer system or a dedicated machine), or a combination of both. Method 600 may be performed by a host based DLP system, such as those discussed with reference to the preceding figures.

Referring to FIG. 6, at block 602 processing logic detects one or more indicators of a potential data loss threat. Such indicators may include the presence of new software, suspicious activity by new or existing software, detection of a potential intrusion attempt, etc. In one embodiment, the indicators of potential data loss threat are detected by a malware detection agent using heuristic and/or signature based malware detection and/or intrusion detection algorithms. The malware detection agent may be, for example, an antivirus system and/or a host based intrusion detection system.

At block 608, a data loss prevention (DLP) policy is enabled to mitigate a risk of data loss. The DLP policy may be enabled to respond to the potential data loss threat. In one embodiment, enabling the data loss prevention policy includes activating a security agent. In one embodiment, the security agent is a file system filter driver 116 that filters I/O operations that are directed to sensitive data. In another embodiment, the security agent is included in firmware of a storage device. The security agent may prevent I/O operations that are directed to sensitive data from being performed. Alternatively, security agent may reside in a virtual machine monitor (otherwise known as a hypervisor). The security agent may prevent I/O operations requested by applications or routines running on any or all guest operating systems from being performed.

Enabling the data loss prevention policy may also include notifying the security agent of sensitive data locations (block 612). A notification of sensitive data locations may be sent to the security agent upon enabling the DLP policy and/or may be sent to the security agent as sensitive data locations are updated.

At block 610, if processing logic is in communication (or a host based DLP system is otherwise available) with a network based DLP system, it notifies the network based DLP system of the potential data loss threat at block 615. If there is no available network based DLP, then the method proceeds to block 626.

At block 626, processing logic determines whether the potential threat has been resolved. For example, if the potential threat was caused by the presence of new software, then the potential threat may be resolved once it is determined that the new software is not a worm, virus, Trojan horse or spyware. If the potential threat has not been resolved, the method repeats block 626. If the potential threat has been resolved, the method continues to block 630, and the DLP policy is disabled. The method then ends.

Figure 7:
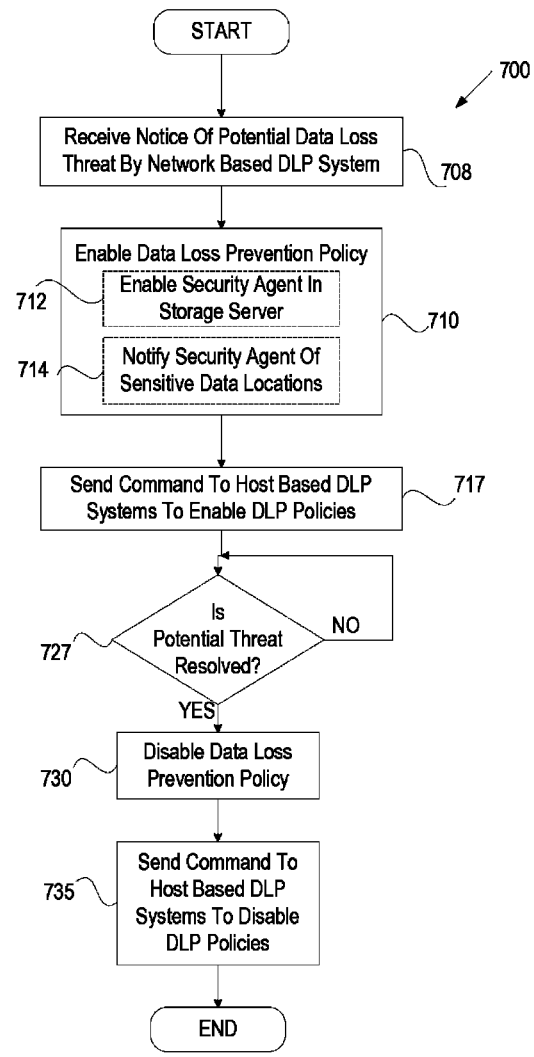
FIG. 7 is a flow diagram of another embodiment for a method of protecting sensitive data.

FIG. 7 is a flow diagram of another embodiment for a method 700 of protecting sensitive data. The method 700 is performed by processing logic that may comprise hardware (circuitry, dedicated logic, etc.), software (such as is run on a general purpose computer system or a dedicated machine), or a combination of both. In one embodiment, method 700 is performed by network based DLP system 430 of FIG. 4.

Referring to FIG. 7, at block 708 a network based data loss prevention (DLP) system receives a message notifying it that a potential threat of data loss has been detected by a host based DLP system. At block 710, the network based DLP system enables a data loss prevention (DLP) policy to mitigate a risk of data loss. In one embodiment, enabling the data loss prevention policy includes activating a security agent that resides on a storage server (block 712). While the security agent is active, the storage server may not permit any access to sensitive data stored on network storage, or may encrypt sensitive data before permitting access. Enabling the data loss prevention policy may also include notifying the security agent of sensitive data locations (block 714).

At block 717, the network based DLP system sends a command to one or more host based DLP systems to enable DLP policies. Thereby, data stored locally on computing devices may be protected in addition to data stored on a network.

At block 727, the network based DLP system determines whether the potential threat has been resolved. If the potential threat has been resolved, the method continues to block 730. Otherwise, the method repeats block 727.

At block 730, the network based DLP system disables the DLP policy. At block 735, the network based DLP system sends commands to the host based DLP systems to cause the host based DLP systems to also disable DLP policies. The method then ends.

Figure 8:
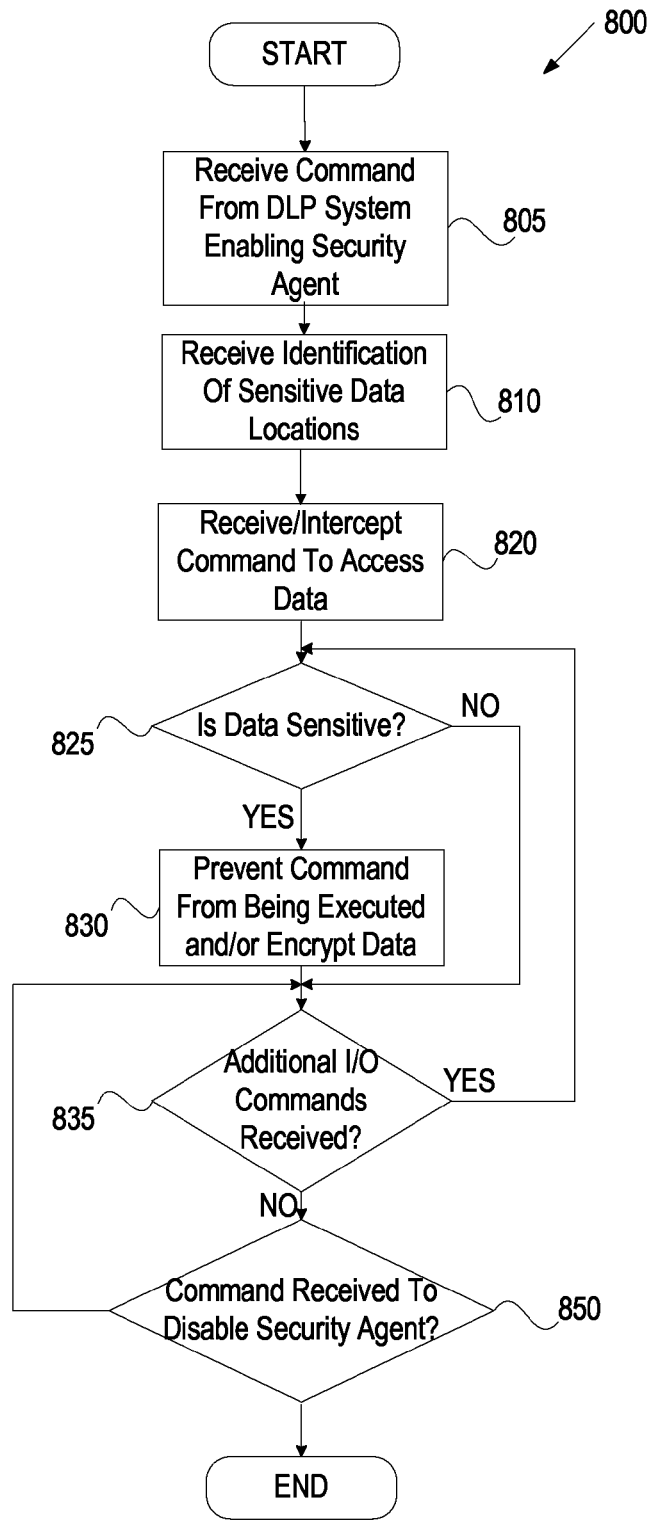
FIG. 8 is a flow diagram of yet another embodiment of a method for protecting sensitive data

FIG. 8 is a flow diagram of yet another embodiment of a method 800 for protecting sensitive data. The method 800 is performed by processing logic that may comprise hardware (circuitry, dedicated logic, etc.), software (such as is run on a general purpose computer system or a dedicated machine), or a combination of both. Method 800 may be performed by a security agent, such as those discussed with reference to the preceding figures. For example, the security agent may reside in firmware of a storage device, on a storage server, on a virtual machine monitor, at the kernel level of an operating system, etc.

Referring to FIG. 8, at block 805 processing logic receives a command to activate a security agent. At block 810, the security agent receives identification of sensitive data locations. The identification of sensitive data locations may be included in the command that causes the security agent to become active. Alternatively, the identification of sensitive data locations may be received by the security agent when sensitive data locations are updated. Such identification information may be received and stored in one embodiment even while the security agent is disabled.

At block 820, the security agent receives (e.g., intercepts) an I/O request (e.g., a request to access data). At block 825, the security agent determines whether the I/O request is directed to sensitive data. In one embodiment, the security agent maintains a record of locations (e.g., file system or logical volumes that contain sensitive data, blocks of a storage device that contain sensitive data, etc.) based on information that is received at block 810. Security agent may compare the received I/O operation to the record to determine whether the I/O request is directed to a location that contains sensitive data. If the I/O request is directed to sensitive data, the method proceeds to block 830. Otherwise, the method continues to block 835.

At block 830, security agent prevents the I/O operation/command from being executed. Alternatively, the security agent may encrypt the sensitive data before performing the I/O operation. The mechanism by which the I/O operation is blocked may depend on the DLP policy that has been enabled to protect the sensitive data. For example, if the DLP policy enabled a security agent of a storage device or of a hypervisor, then the security agent may block the I/O request. If the DLP policy enabled a file system filter driver, then the file system filter driver may block the I/O operation.

At block 835, if additional commands for I/O operations are received, the method returns to block 825. If no additional I/O operation commands are received, the method continues to block 850. At block 850, if the security agent receives a command to disable itself, the security agent is disabled and the method ends. If no such command has been received, the method returns to block 835.

Figure 9:
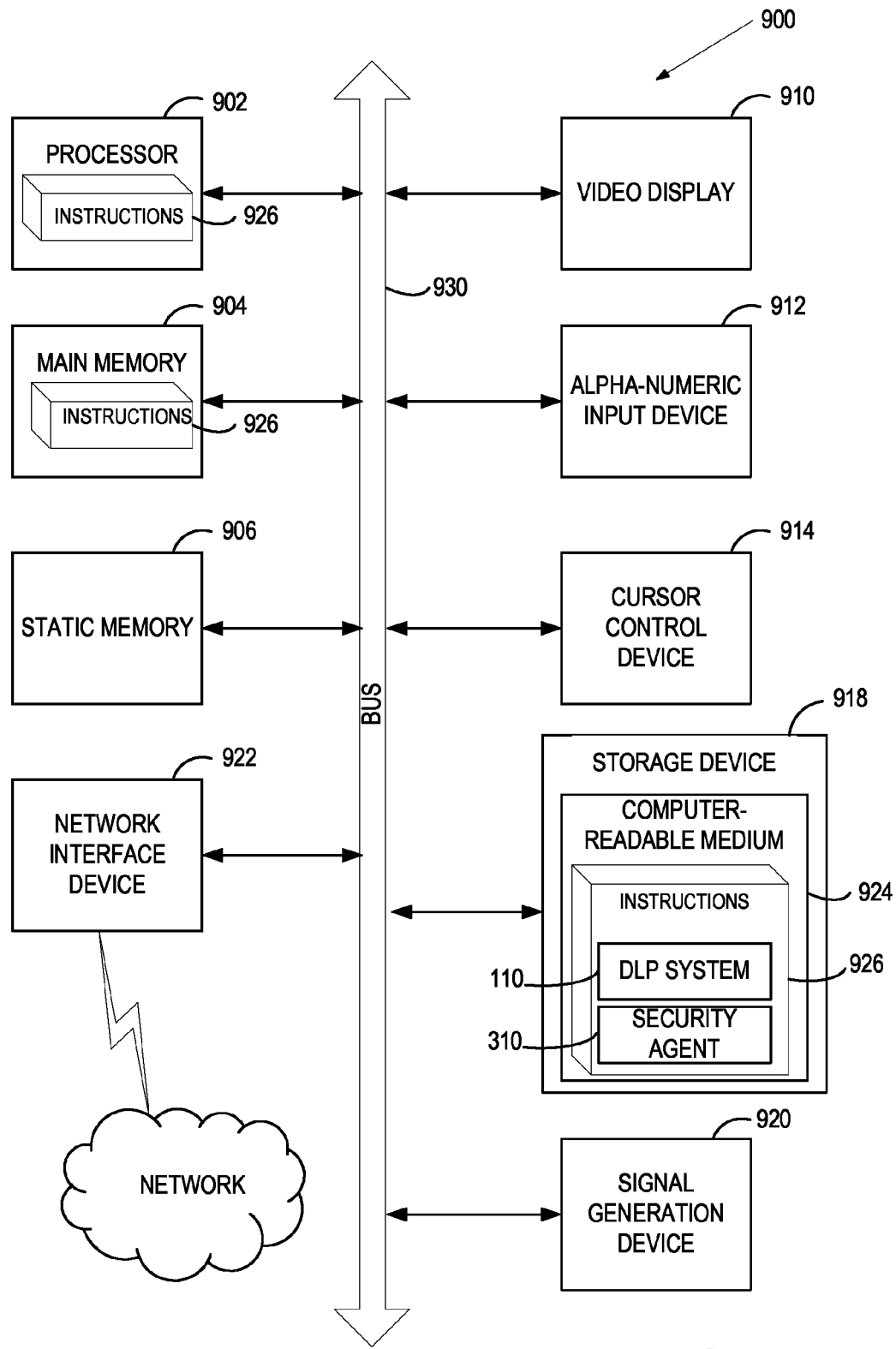
FIG. 9 is a block diagram of an exemplary computer system that may perform one or more of the operations described herein.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute instructions 926 for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a machine-accessible storage medium 924 on which is stored one or more sets of instructions 926 embodying any one or more of the methodologies or functions described herein. For example, the instructions 926 may include instructions for a host based DLP system 110 or security agent 310. The instructions 926 may also reside, completely or at least partially, within the main memory 904 and/or within the processor 902 during execution thereof by the computer system 900, the main memory 904 and the processor 902 also constituting machine-accessible storage media.

While the computer-readable storage medium 924 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A computer-implemented method comprising:
    detecting a potential data loss threat by a computing device comprising a data loss prevention system comprising a malware detection agent, wherein the malware detection agent uses at least one of heuristic based malware detection or signature based malware detection to detect a software component that poses the potential data loss threat;
    identifying at least one protected file system location comprising sensitive data, wherein the at least one protected file system location comprises at least one of a block or a sector;
    activating, by the computing device, one or more security agents to protect the sensitive data in the at least one protected file system location in response to detecting the potential data loss threat, wherein the one or more security agents, when activated, protect the sensitive data by impeding input/output (I/O) operations directed to the at least one protected file system location while permitting I/O operations directed to other file system locations based on performing operations comprising:
        determining whether an I/O operation is directed to the at least one protected file system location; and
        blocking the I/O operation responsive to determining that the I/O operation is directed to the at least one protected file system location;
    automatically determining whether the potential data loss threat is resolved; and
    disabling the one or more security agents in response to determining that the potential data loss threat is resolved and maintaining the one or more security agents as active in response to determining that the potential data loss threat is not resolved.

2. The method of claim 1, wherein activating one or more security agents comprises:
enabling one or more data loss prevention policies comprising the one or more security agents.

3. The method of claim 1, wherein the one or more security agents further protect the sensitive data by performing the following comprising:
encrypting data blocks in the at least one protected file system location that contains the sensitive data.

4. The method of claim 1, wherein:
the one or more security agents comprise a file system filter driver;
determining whether the I/O operation is directed to the at least one protected file system location comprises intercepting by the file system filter driver a command to access the sensitive data and determining that the sensitive data resides in a protected logical location; and
blocking the I/O operation comprises preventing the command from being executed.

5. The method of claim 1, wherein:
the one or more security agents comprise a firmware level security agent that is resident in a storage device;
determining whether the I/O operation is directed to the at least one protected file system location comprises receiving by the firmware level security agent a request to access blocks that contain the sensitive data and determining that the blocks are protected blocks; and
blocking the I/O operation comprises failing to execute the request.

6. The method of claim 1, wherein:
the one or more security agents comprise a component of a hypervisor;
determining whether the I/O operation is directed to the at least one protected file system location comprises receiving a request to access the sensitive data, the request being received from a virtual machine by the hypervisor, and determining by the hypervisor that the sensitive data is protected; and
blocking the I/O operation comprises preventing the command from being executed.

7. The method of claim 1, further comprising:
sending a message via a network to a network based data loss prevention system, wherein the message causes the network based data loss prevention system to enable a data loss prevention policy, wherein the data loss prevention policy protects the sensitive data from being accessed by any device on the network based on at least one of encrypting the sensitive data or denying access to the sensitive data.

8. The method of claim 1, wherein the block comprises a disk block and the sector comprises a disk sector.

9. The method of claim 1, wherein the data loss prevention system comprises a user mode component and a kernel mode component.

10. A non-transitory computer readable storage medium including instructions that, when executed by a processor in a computing device that comprises a data loss prevention system, cause the processor to perform a method comprising:
detecting, by the processor, a potential data loss threat, wherein a malware detection agent executed by the processor uses at least one of heuristic based malware detection or signature based malware detection to detect a software component that poses the potential data loss threat;
identifying at least one protected file system location comprising sensitive data, wherein the at least one protected file system location comprises at least one of a block or a sector;
activating, by the processor, one or more security agents to protect the sensitive data in the at least one protected file system location in response to detecting the potential data loss threat, wherein the one or more security agents, when activated, impede input/output (I/O) operations directed to the at least one protected file system location while permitting I/O operations directed to other file system locations based on performing operations comprising:
determining whether an I/O operation is directed to the at least one protected file system location; and
blocking the I/O operation responsive to determining that the I/O operation is directed to the at least one protected file system location;
automatically determining whether the potential data loss threat is resolved; and
disabling the one or more security agents in response to determining that the potential data loss threat is resolved and maintaining the one or more security agents as active in response to determining that the potential data loss threat is not resolved.

11. The non-transitory computer readable storage medium of claim 10, wherein activating one or more security agents comprises:
enabling one or more data loss prevention policies comprising the one or more security agents.

12. The non-transitory computer readable storage medium of claim 10, wherein the one or more security agents further protect the sensitive data by performing the following comprising:
encrypting data blocks in the at least one protected file system location that contains the sensitive data.

13. The non-transitory computer readable storage medium of claim 10, wherein:
the one or more security agents comprise a file system filter driver;
determining whether the I/O operation is directed to the at least one protected file system location comprises intercepting by the file system filter driver a command to access the sensitive data and determining that the sensitive data resides in a protected logical location; and
blocking the I/O operation comprises preventing the command from being executed.

14. The non-transitory computer readable storage medium of claim 10, wherein:
the one or more security agents comprise a firmware level security agent that is resident in a storage device;
determining whether the I/O operation is directed to the at least one protected file system location comprises receiving by the firmware level security agent a request to access blocks that contain the sensitive data and determining that the blocks are protected blocks; and
blocking the I/O operation comprises failing to execute the request.

15. The non-transitory computer readable storage medium of claim 10, wherein:
the one or more security agents comprise a component of a hypervisor;
determining whether the I/O operation is directed to the at least one protected file system location comprises receiving a request to access the sensitive data, the request being received from a virtual machine by the hypervisor, and determining by the hypervisor that the sensitive data is protected; and blocking the I/O operation comprises preventing the command from being executed.

16. The non-transitory computer readable storage medium of claim 10, the method further comprising:

sending a message via a network to a network based data loss prevention system, wherein the message causes the network based data loss prevention system to enable a data loss prevention policy, wherein the data loss prevention policy protects the sensitive data from being accessed by any device on the network based on at least one of encrypting the sensitive data or denying access to the sensitive data.

17. A system comprising:

a computing apparatus having a memory including instructions for enabling data loss prevention policies, and a processor, connected with the memory, to execute the instructions, wherein the instructions cause the processor to:

detect a potential data loss threat by a malware detection agent, wherein the malware detection agent uses at least one of heuristic based malware detection or signature based malware detection to detect a software component that poses the potential data loss threat;

identify at least one protected file system location comprising sensitive data;

activate one or more security agents to protect the sensitive data in the at least one protected file system location in response to detecting the potential data loss threat, wherein the at least one protected file system location comprises at least one of a block or a sector, and wherein the one or more security agents, when activated, impede input/output (I/O) operations directed to the at least one protected file system location while permitting I/O operations directed to other file system locations based on performing operations comprising:

determining whether an I/O operation is directed to the at least one protected file system location; and blocking the I/O operation responsive to determining that the I/O operation is directed to the at least one protected file system location;

automatically determine whether the potential data loss threat is resolved; and disable the one or more security agents in response to determining that the potential data loss threat is resolved and maintain the one or more security agents as active in response to determining that the potential data loss threat is not resolved.

18. The system of claim 17, wherein:

the one or more security agents comprise a file system filter driver;

determining whether the I/O operation is directed to the at least one protected file system location comprises intercepting by the file system filter driver a command to access the sensitive data and determining that the sensitive data resides in a protected logical location; and blocking the I/O operation comprises preventing the command from being executed.

19. The system of claim 17, further comprising:

a storage device having firmware that comprises the one or more security agents, wherein:

determining whether the I/O operation is directed to the at least one protected file system location comprises receiving a request to access blocks that contain the sensitive data and determining that the blocks are protected blocks; and blocking the I/O operation comprises failing to execute the request.

20. The system of claim 17, wherein:

the one or more security agents comprise a component of a hypervisor;

determining whether the I/O operation is directed to the at least one protected file system location comprises receiving by the hypervisor a request to access the sensitive data from a virtual machine and determining that the sensitive data is protected; and blocking the I/O operation comprises preventing the command from being executed.

* * * * *